P. BONVILLAIN & E. RONCERAY.
MOLDING MACHINE.
APPLICATION FILED APR. 22, 1907.
No. 910,167.                    Patented Jan. 19, 1909.
5 SHEETS—SHEET 1.
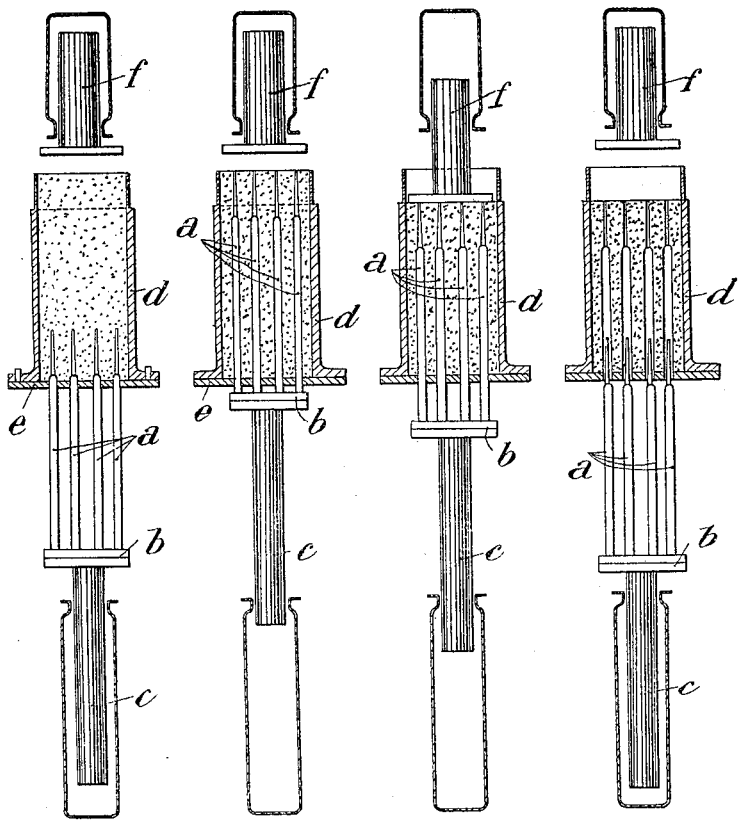
Fig. 1.   Fig. 2.   Fig. 3.   Fig. 4.
Fig. 5.
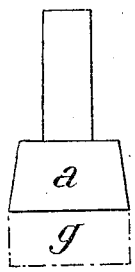
Fig. 6.
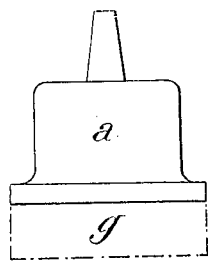

P. BONVILLAIN & E. RONCERAY.
MOLDING MACHINE.
APPLICATION FILED APR. 22, 1907.

910,167.

Patented Jan. 19, 1909.
5 SHEETS—SHEET 2.

Witnesses:
L. W. Laitinen
Tho. F. Marshall

Inventors:
Philibert Bonvillain and
Eugène Ronceray,
By Worth Osgood
Attorney.

P. BONVILLAIN & E. RONCERAY.
MOLDING MACHINE.
APPLICATION FILED APR. 22, 1907.

910,167.

Patented Jan. 19, 1909.
5 SHEETS—SHEET 5.

Witnesses:
L. W. Laitinen.
Geo. F. Marshall

Inventors:
Philibert Bonvillain and
Eugene Ronceray,
By Worth Osgood
Attorney

THE NORRIS PETERS CO., WASHINGTON, D. C.

UNITED STATES PATENT OFFICE.

PHILIBERT BONVILLAIN AND EUGÈNE RONCERAY, OF PARIS, FRANCE, ASSIGNORS TO THE E. H. MUMFORD COMPANY, OF PHILADELPHIA, PENNSYLVANIA, A CORPORATION OF PENNSYLVANIA.

MOLDING-MACHINE.

No. 910,167.      Specification of Letters Patent.      Patented Jan. 19, 1909.

Application filed April 22, 1907. Serial No. 369,684.

*To all whom it may concern:*

Be it known that we, PHILIBERT BONVILLAIN and EUGÈNE RONCERAY, two citizens of the Republic of France, residing at Paris, in France, have invented certain new and useful Improvements in Molding-Machines, of which the following is a specification.

The invention relates to molding machines; and has for its primary objects; the provision of a machine particularly adapted to the formation of deep molds having portions of greatly varying depth, and wherein a uniform compacting of the sand in all parts of the machine is secured; and the provision of improved and simplified stop mechanism for regulating the movement of the operating mechanism. Certain embodiments of the invention are illustrated in the accompanying drawings, wherein:—

Figures 1, 2, 3, 4, 5 and 6 are a series of diagrammatic views intended to facilitate the understanding of the steps performed in the machine.

Figure 7:
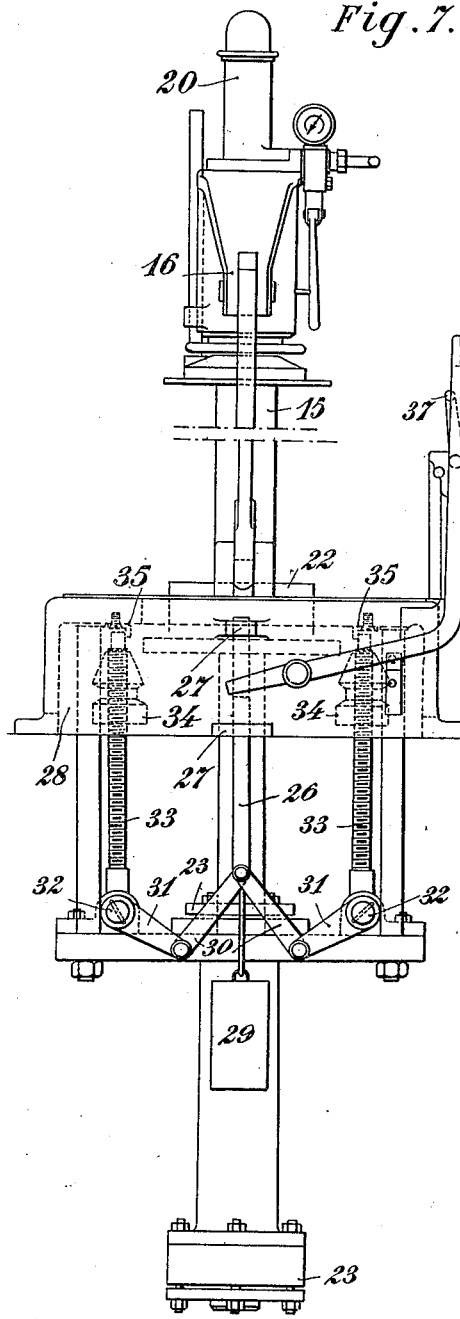
Figure 7 is an elevation of the machine.

Referring first to the diagrammatic views 1 to 6 inclusive, it will be seen that the patterns *a* are longer than the finished molds, and that these patterns *a* are fixed on a pattern plate *b* which is in turn fastened to the piston *c*. A stripping plate *e* serves as the mold table for supporting the flask. Above the flask *e* is the piston *f* for ramming the sand. The flask is first filled with sand as illustrated in Figure 1, after which the pattern plate *b* with its patterns *a* are advanced to the position shown in Figure 2. The piston *f* is then advanced as shown in Figure 3, and the presser plate by engaging the projections on the ends of the patterns *a* causes such patterns and the pattern plate to move backward as the piston advances. In this manner an undue compacting of the sand above the ends of the pattern members *a* is avoided, and a uniform pressure throughout the mold is secured. The final operation is the withdrawal of the pistons *f* and *c* as indicated in Figure 4.

If desired the pattern used may be of the form shown in Figures 5 and 6, or in fact of any desired form. When the patterns are of the forms shown in Figs. 5 and 6 additions corresponding to members *g* shown in dotted lines, are necessary, the height of such additions being the distance back which the patterns move during the forward movement of the compressing piston. It will be noted that each of the patterns shown in Figs. 5 and 6 is provided with an upper rigid extension corresponding to the extensions on the ends of the pattern members *a* in the device of Figures 1 to 4 with which the ramming piston is designed to engage in order to move the patterns backwards. If desired these projections may constitute formers for the sprue holes. It will also be seen that these spacing projections do not necessarily have to pass through the sand of the mold in order to accomplish the desired result, but might be placed on the pattern plate to the side of the flask in position to engage a projecting part on the ramming piston. Among the many castings which may be made to great advantage by use of the apparatus are shells, sauce-pans, radiator pies, and axle-boxes.

The machine employed will now be described in detail. A cross beam 16 which turns freely, and of a strong design is placed at the end of a vertical column 15 with a cylinder 17 in which the ramming piston *f* works, and which is provided with a piston rod 18 carrying a piston 19. This piston 19 works in another cylinder 20 which is placed on the top of the cylinder 17 and is used to raise the piston *f* and the pressing plate to which it is attached.

The piston *c* is placed in a lower cylinder 21, and the piston-rod carries a table 22 at its upper end. In this machine the piston *c* has a piston rod which passes through the top and bottom ends of the cylinder 21, and is provided with the stuffing boxes 23, 23. The oposite sides of this piston may be put under water pressure by means of piping connected with the openings 24 and 25.

Means are provided for stopping the table 22 in the position shown in Figure 3, which means comprises the nuts 34 mounted on the screw spindles 33 to swing about the pins 32. The pins 32 are mounted in bearings which are rigidly fixed to the frame of the machine. As shown in Figure 7 the projecting edge of the table 22 is in position to engage the nuts 34 on its downward movement, and each of the nuts is provided with a conical head, and an annular recess immediately below such conical head. The spindles 33 with their nuts are normally held in the position shown in Figure 7 by means of the counter weight 29 which is hung from the inner ends of the links 30, the outer ends of such links engaging the levers 31, which are keyed on to the pins 32 so as to oscillate such pins, and the spindles 33 carried thereby. Projecting stops 35 engaging the upper ends of the spindles 33, prevent such ends from moving inward from the position shown. The nuts may be swung outwards when desired, by means of the lever 36, whose inner end engages the slot in the upper end of the bar 26, such bar 26 being in engagement with the upper ends of the links 30. The downward movement of the plate 22 causes the engagement of its lower edge with the cone portions of the nuts 34, so that the nuts are cammed slightly outward to permit the lower edge of the plate to engage in the annular recesses, at which time the nuts move inward again, and the plate 22 is securely held against movement in either direction. In order that the plate 22 may move still further downward it is necessary to actuate the handle 36 thereby swinging the nuts 34 outwards, after which the plate may be moved down to the position of Figure 1. The flow of water for operating the piston c is controlled from the valve 38 operated by the handle 37.

Figure 8:
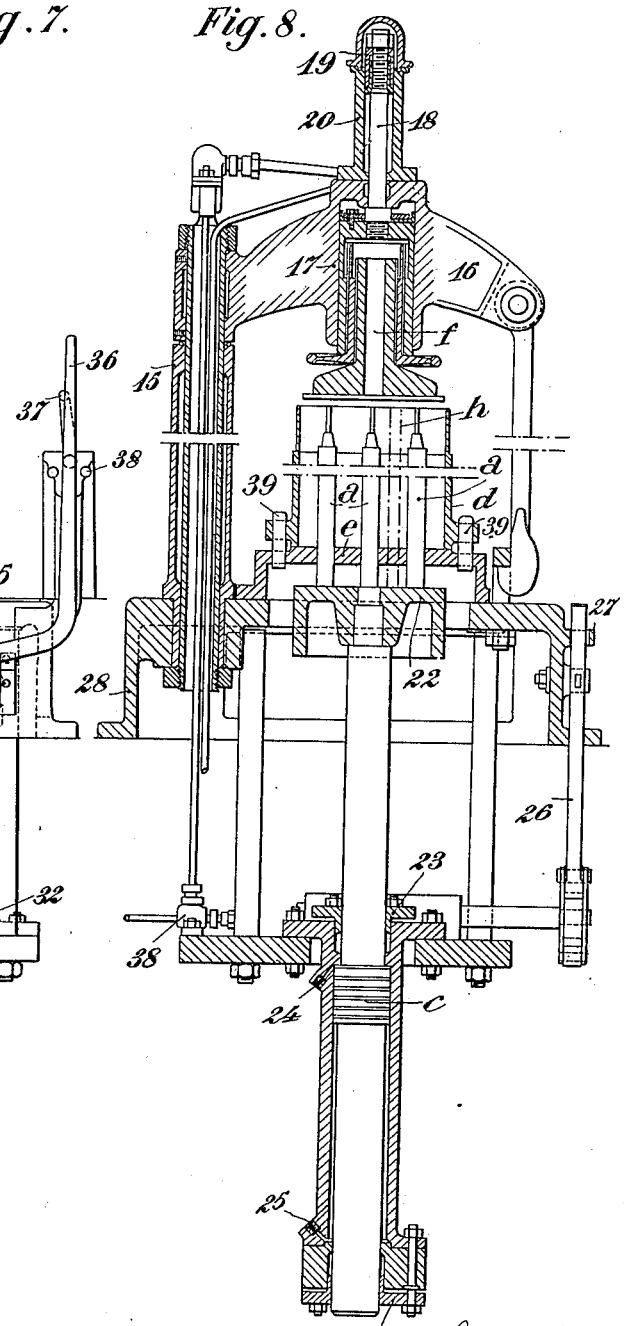
Figure 8 is a longitudinal vertical section through the machine taken at right angles to the elevation of Figure 7.

Starting with the parts in the position of Figure 1, the operation is as follows: The flask d is first filled with sand, after which the handle 36 is swung to the right thereby swinging the nuts 34 outwards to permit the upward movement of the plate 22, as the handle 37 is operated to admit pressure beneath the piston c. This causes the upward movement of the plate 22 to the position shown in Figures 2 and 8. The piston f is now moved downward preliminarily pressing the sand above the ends of the projections on the patterns a, and finally engaging such projections and carrying the patterns down to the position shown in Figure 3, at the same time compressing the sand throughout the entire mold. When the parts arrive at the position shown in Figure 3, the lower edge of the pattern plate 22 has cammed back the nuts 34 and is in engagement with the annular recesses therein. The lower side of the piston c is still under pressure and this is released by operating the handle 37. The pressure on the piston f is also released and pressure admitted to the cylinder 18 in order to raise the piston f with its presser head out of the flask d. The stop nuts 34 are then moved outwards to permit the entire withdrawal of the patterns by operating the handle 36. It will be seen that the stop nuts 34 may be adjusted very easily and accurately by simply rotating them upon the spindles 33. If it is inconvenient to provide the upper portions of the pattern members with the engaging or spacing projections, spacing rods h (in dotted line Fig. 8) may be substituted therefor, such spacing members being inserted in the sand of the mold.

Figure 9:
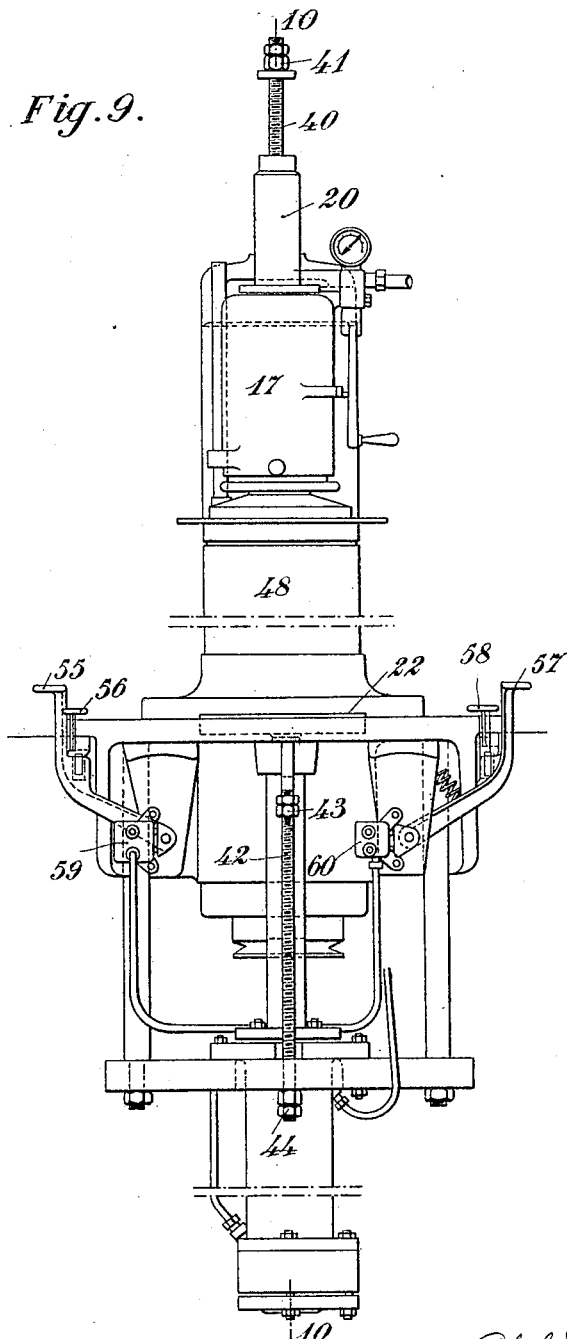
Figure 9 is an elevation of another type of machine.
Figure 10:
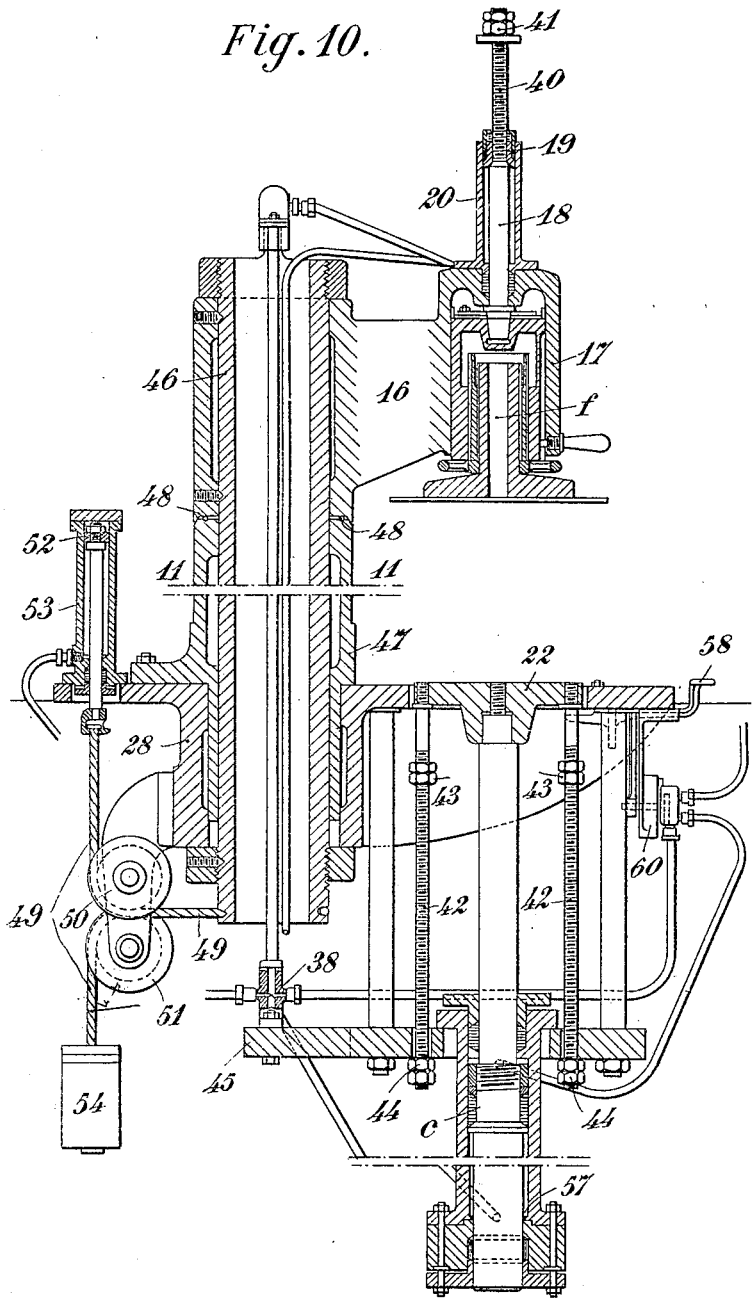
Figure 10 is a vertical section on the line 10—10 of Figure 9.
Figure 11:
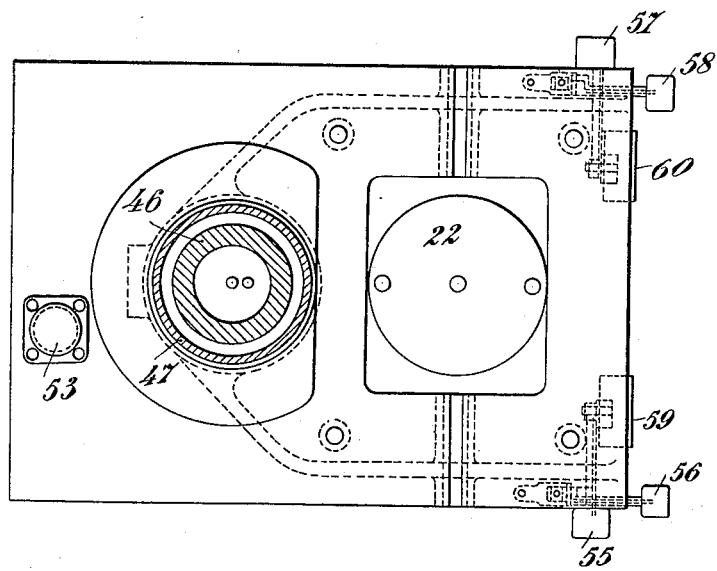
Figure 11 is a horizontal section on the line 11—11 of Figure 10.

In the machine represented by Figures 9 and 10, the ramming piston f is as in the preceding case, connected to the raising piston 19 by a piston rod 18, but this rod has an external screw extension 40 on which is screwed a nut 41 which is held by a lock nut. This nut 41 is made to come in contact with the top part of the cylinder 20 of the raising piston 19, when the piston f is at the end of its descending stroke. By screwing the nut 41 up and down on the screw 40, the stroke of the piston f can easily be regulated according to the exact length or height which has to be given to the mold.

Under the table 22 which carries the patterns, two threaded spindles are placed symmetrically on either side of the piston c. At the upper end of these spindles the nuts 43 are screwed, and at the bottom the nuts 44, which nuts are arranged to come respectively in contact with the top and bottom of the plate 45 which serves to support the machine. By screwing the nuts 43 and 44 up and down the spindles 42, the stroke of the piston c can easily be regulated either way.

In this machine the top cross beam 16 is made in one piece with the cylinder 17 of the piston f and is supported by a tube bearing 46 which turns freely in the interior of a column 47 fixed vertically on the frame of the machine 28, and the cross beam 16 bears on a ball bearing 48 placed in the top face of the column 47 in order to facilitate its rotation.

This tube bearing has a groove turned in it at the lower end, in which runs a cord 49 which passes over the transmission pulleys 50 and 51. This cord is attached to a rod of a hydraulic piston 22 which works in a stationary cylinder 53. At the other end of the cord is a counterweight 54. When the piston 52 is put under pressure, it rises, taking the counter-weight 54 with it and the cord 49 turns the bearing 46 with the cross beam 16 a quarter of a revolution from its normal position and permits easier access to the flask and patterns. When the pressure is released the weight returns to its former position and the cord turns the cross beam 16 and the piston *f* to their normal working position.

On each side and in front of the machine two pairs of pedals 55—56 and 57—58 are placed. The pedal 55 controls the valve 59 which allows the water to pass to the cylinder 53 and the other pedal 57 controls the other valve which allows the water to pass to the top of the piston *c*, the bottom area of which is smaller than the top area and always under accumulator pressure.

Figure 12:
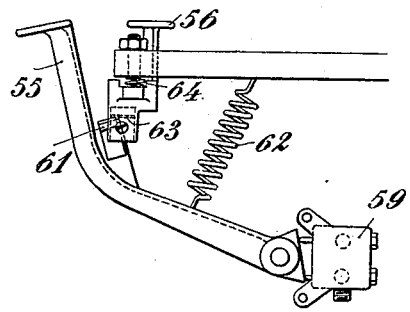
Figure 12 is a front view of the pedal arrangement for working the valve.
Figure 13:
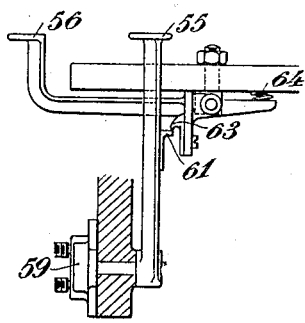
Figure 13 is a side view of the construction of Fig. 12.

The mechanism of these two pairs of pedals is identically the same and one of them is shown by Figures 12 and 13. The pedal 55 which actuates the valve 59 is provided with a side stop 61 and is kept in position by the action of a spring 62 which constantly tends to raise it. The pedal 56 is also provided with a stop made to hold the stop 61 and the pedal 55 when the latter is lowered. A spring 64 acts at one end of the pedal 56 in order to raise it again.

When the pedal 55 is lowered to work the valve 59, and allows the water to pass to the cylinder 53, the stop 61 catches under the stop 63 and the pedal 55 is thus kept in its lowered position. When it is desired to raise the pedal again and permit water from the cylinder to be exhausted in order to make the piston 52 descend under the influence of the weight 54, pressure is put on the pedal 56. The stop 63 lowers the stop 61 and the pedal 55 a little way, but finally the stop 63 slides over the stop 61 and disengages therefrom and the pedal 55 is raised by the action of the spring 62 and works the valve 59 in order to bring about the desired result.

Having thus described our invention and illustrated its use, what we claim as new and desire to secure by Letters Patent is the following:—

1. In a molding machine, a stripping plate, a reciprocable pattern extending therethrough, a flask on the stripping plate, reciprocatory presser means for compressing the sand constituting the mold, a spacing member operated by the presser means for moving the pattern back through the stripping plate as the presser means advances.

2. In a molding machine, a stripping plate, a reciprocable pattern extending therethrough, a flask on the stripping plate, presser means above the mold for compressing the sand constituting the mold, and a member mounted on the pattern and extending up through the mold for engaging the presser means and causing the backward movement of the pattern through the stripping plate as the presser means advances.

3. In a molding machine, a stripping plate, a reciprocable pattern extending therethrough, a flask on the stripping plate, presser means above the mold for compressing the sand constituting the mold, and an operating member mounted to move with the pattern and adapted to engage a part moving with the presser means, to move the pattern backward as the presser means advances.

4. In a molding machine, a stripping plate, a reciprocable pattern extending therethrough, a flask on the stripping plate, presser means for compressing the sand constituting the mold, and a movable spacing member for stopping the approach of the presser means and pattern and carrying the pattern back through the stripping plate during the compression of the sand.

5. In a molding machine, a stripping plate, a reciprocable pattern extending therethrough, a flask on the stripping plate, presser means above the mold for compressing the sand constituting the mold, and a sprue pin mounted on the pattern and extending up through the mold for engaging the presser means and causing the backward movement of the pattern through the stripping plate as the presser means advances.

6. In a molding machine, a stripping plate, a reciprocable pattern extending therethrough, a flask on the stripping plate, presser means above the mold for compressing the sand constituting the mold, means for yieldingly holding the pattern in advanced position, a spacing member operated by the presser means for moving the pattern back through the stripping plate as the presser means advances, and engaging means for stopping the backward movement of the pattern at a predetermined point.

7. In a molding machine, a stripping plate, a reciprocable pattern extending therethrough, a flask on the stripping plate, presser means above the mold for compressing the sand constituting the mold, means for yieldingly holding the pattern in advanced position, means operated by the presser means for moving the pattern back through the stripping plate as the presser means advances and at the same rate of speed as that of the presser means, and a stop for automatically preventing the forward movement of the presser means and the pattern after such parts have been moved a predetermined distance.

8. In a molding machine, a stripping plate, a reciprocable pattern extending therethrough, a flask on the stripping plate, presser means above the mold for compressing the sand constituting the mold, and a connecting member operated by the presser means after a certain preliminary compression is given the sand for moving the pattern back through the stripping plate as the presser means advances.

9. In a molding machine, a relatively movable stripping plate and presser member, a reciprocable pattern extending through the stripping plate, a flask between the stripping plate and presser member, and positive means operated by one of the relatively movable parts during their approach for moving the pattern back through the stripping plate during the compression of the sand constituting the mold.

10. In a molding machine a relatively movable stripping plate and presser member, a reciprocable pattern extending through the stripping plate, a flask between the stripping plate and presser member, and an operating member adapted to positively space the pattern and presser member a fixed distance apart and cause the rearward movement of the pattern as the stripping plate and presser means approach during the compression of the sand constituting the mold.

11. In a molding machine, a relatively movable stripping plate and presser member, a reciprocable pattern extending through the stripping plate, means for holding the pattern yieldingly in advanced position, a flask between the stripping plate and presser member and a member for spacing the pattern and presser member apart and causing the rearward movement of the pattern during the approach of the stripping plate and presser member, at the same rate of speed as the said movement of approach.

12. In a molding machine, a stripping plate, a reciprocable pattern extending therethrough, a flask on the stripping plate, presser means above the mold for compressing the sand constituting the mold, means for yieldingly holding the pattern in advanced position, means operated synchronously with the presser means for moving the pattern back through the stripping plate as the presser means advances, and automatic catch means for engaging the pattern when it reaches its rearmost position and preventing its movement in either direction.

13. In a molding machine, a stripping plate, a reciprocable pattern extending therethrough, a flask on the stripping plate, presser means above the mold for compressing the sand constituting the mold, means for yieldingly holding the pattern in advanced position, means operated synchronously with the presser means for moving the pattern back through the stripping plate as the presser means advances, and automatic catch means for engaging the pattern when it reaches its rearmost position and preventing its movement in either direction comprising an adjustable nut yieldingly held adjacent the path of travel of a part moving with the pattern and having a coned head and an annular engaging recess thereбеneath.

14. In a molding machine, a stripping plate, a reciprocable pattern extending therethrough, a flask on the stripping plate, presser means above the mold for compressing the sand constituting the mold, means operated synchronously with the presser means for moving the pattern back through the stripping plate as the presser means advances, and automatic catch means for engaging the pattern when it reaches its rearmost position and preventing its movement in either direction comprising a nut mounted to oscillate on a counterweighted spindle adjacent the path of travel of a part moving with the pattern and having a coned head and an annular engaging recess thereбeneath.

In testimony whereof we have affixed our names to this specification in the presence of two subscribing witnesses.

PHILIBERT BONVILLAIN.
EUGÈNE RONCERAY.

Witnesses:
H. C. COXE,
JULIEN EAVEMS.